United States Patent
Sharp et al.

(10) Patent No.: US 12,018,728 B2
(45) Date of Patent: Jun. 25, 2024

(54) GENERATOR MOUNTING SKID WITH ISOLATORS AND AUXILIARY SUPPORT SYSTEM

(71) Applicant: STEWART & STEVENSON LLC, Houston, TX (US)

(72) Inventors: Brian Sharp, Houston, TX (US); Chris Harvell, Houston, TX (US)

(73) Assignee: STEWART & STEVENSON LLC, Houston, TX (US)

( * ) Notice: Subject to any disclaimer, the term of this patent is extended or adjusted under 35 U.S.C. 154(b) by 0 days.

(21) Appl. No.: 18/202,546

(22) Filed: May 26, 2023

(65) Prior Publication Data
US 2023/0400084 A1 Dec. 14, 2023

Related U.S. Application Data

(60) Provisional application No. 63/350,191, filed on Jun. 8, 2022.

(51) Int. Cl.
*F16F 15/08* (2006.01)
*F16M 3/00* (2006.01)
*F16M 5/00* (2006.01)
*F16M 7/00* (2006.01)

(52) U.S. Cl.
CPC ............... *F16F 15/08* (2013.01); *F16M 3/00* (2013.01); *F16M 5/00* (2013.01); *F16M 7/00* (2013.01); *F16F 2232/08* (2013.01)

(58) Field of Classification Search
CPC ........ F16F 15/08; F16F 2232/08; F16M 3/00; F16M 5/00; F16M 7/00
See application file for complete search history.

(56) References Cited

U.S. PATENT DOCUMENTS

| 2,917,266 | A | * | 12/1959 | Sanborn | H05K 7/1412 |
| | | | | | 248/507 |
| 7,082,896 | B2 | * | 8/2006 | Allen | F16M 5/00 |
| | | | | | 290/1 A |
| 8,146,899 | B2 | * | 4/2012 | Hiser | B60N 2/502 |
| | | | | | 267/140.3 |
| 8,511,637 | B2 | * | 8/2013 | Mitsch | F01D 25/28 |
| | | | | | 248/677 |
| 8,621,873 | B2 | * | 1/2014 | Robertson | F01D 25/285 |
| | | | | | 248/649 |
| 8,857,781 | B2 | * | 10/2014 | Wang | F16M 7/00 |
| | | | | | 248/678 |

(Continued)

FOREIGN PATENT DOCUMENTS

GB 2598990 A * 3/2022 ............. B60K 17/00

*Primary Examiner* — Eret C McNichols
(74) *Attorney, Agent, or Firm* — Ewing & Jones, PLLC

(57) ABSTRACT

A vibration isolator mount system includes a base rail; a mounting rail coupled to a piece of equipment, the mounting rail including a mounting bracket; and a vibration isolator. The vibration isolator includes an isolator body. The vibration isolator includes a foundation pin, the foundation pin extending downward from the isolator body and through a base hole formed in the base rail. The foundation pin includes a base plate and a foundation elastomeric body. The foundation elastomeric body may be positioned between the isolator body and the base plate. The vibration isolator includes a stud. The stud may extend upward from the isolator body and through a stud hole formed in the mounting bracket.

9 Claims, 6 Drawing Sheets

(56) References Cited

U.S. PATENT DOCUMENTS

| | | | | |
|---|---|---|---|---|
| 9,091,322 B2* | 7/2015 | Wang | ............... | F16M 5/00 |
| 10,173,560 B2* | 1/2019 | Ochs | ............... | B60N 2/542 |
| 10,683,708 B2* | 6/2020 | Hill | ............... | F04B 23/02 |
| 11,118,647 B2* | 9/2021 | Miyazaki | ............ | F16F 15/08 |

* cited by examiner

GENERATOR MOUNTING SKID WITH ISOLATORS AND AUXILIARY SUPPORT SYSTEM

CROSS-REFERENCE TO RELATED APPLICATIONS

This application is a nonprovisional application which claims priority from U.S. provisional application No. 63/350,191, filed Jun. 8, 2022, which is incorporated by reference herein in its entirety.

TECHNICAL FIELD/FIELD OF THE DISCLOSURE

The present disclosure relates generally to vibration isolation and specifically to vibration isolation for mobile power generation systems.

BACKGROUND OF THE DISCLOSURE

Transportation of skid-mounted equipment by trailer may impart vibration and shock loading on the equipment whether on or off road. Also, twisting or axial movement of the trailer may damage equipment mounted thereto. Additionally, operation of certain equipment, such as engines of a generator, may create vibrations that may adversely affect other components on the skid.

SUMMARY

The present disclosure provides for a vibration isolator mount system. The vibration isolator mount system may include a base rail; a mounting rail coupled to a piece of equipment, the mounting rail including a mounting bracket; and a vibration isolator. The vibration isolator may include an isolator body. The vibration isolator may include a foundation pin, the foundation pin extending downward from the isolator body and through a base hole formed in the base rail. The foundation pin may include a base plate and a foundation elastomeric body. The foundation elastomeric body may be positioned between the isolator body and the base plate. The vibration isolator may include a stud. The stud may extend upward from the isolator body and through a stud hole formed in the mounting bracket.

The present disclosure also provides for a system. The system may include a trailer, truck chassis, or skid. The system may include a vibration isolator mount system. The vibration isolator mount system may include a base rail coupled to the trailer, truck chassis, or skid; a mounting rail coupled to a generator set, the mounting rail including a mounting bracket; and a vibration isolator. The vibration isolator may include an isolator body. The vibration isolator may include a foundation pin, the foundation pin extending downward from the isolator body and through a base hole formed in the base rail. The foundation pin may include a base plate and a foundation elastomeric body. The foundation elastomeric body may be positioned between the isolator body and the base plate. The vibration isolator may include a stud. The stud may extend upward from the isolator body and through a stud hole formed in the mounting bracket.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
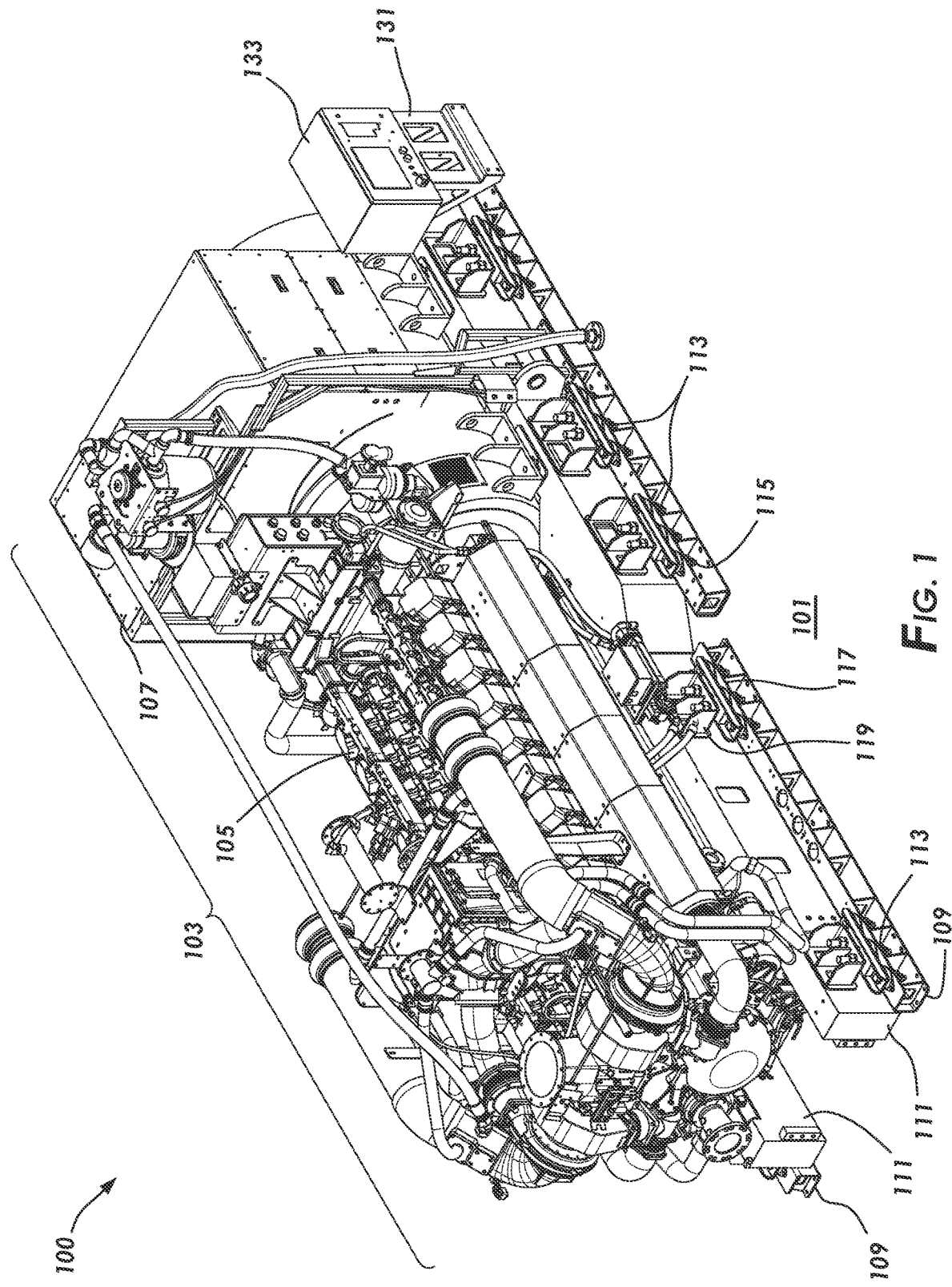
FIG. 1 is a perspective view of a generator set and vibration isolation mount system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
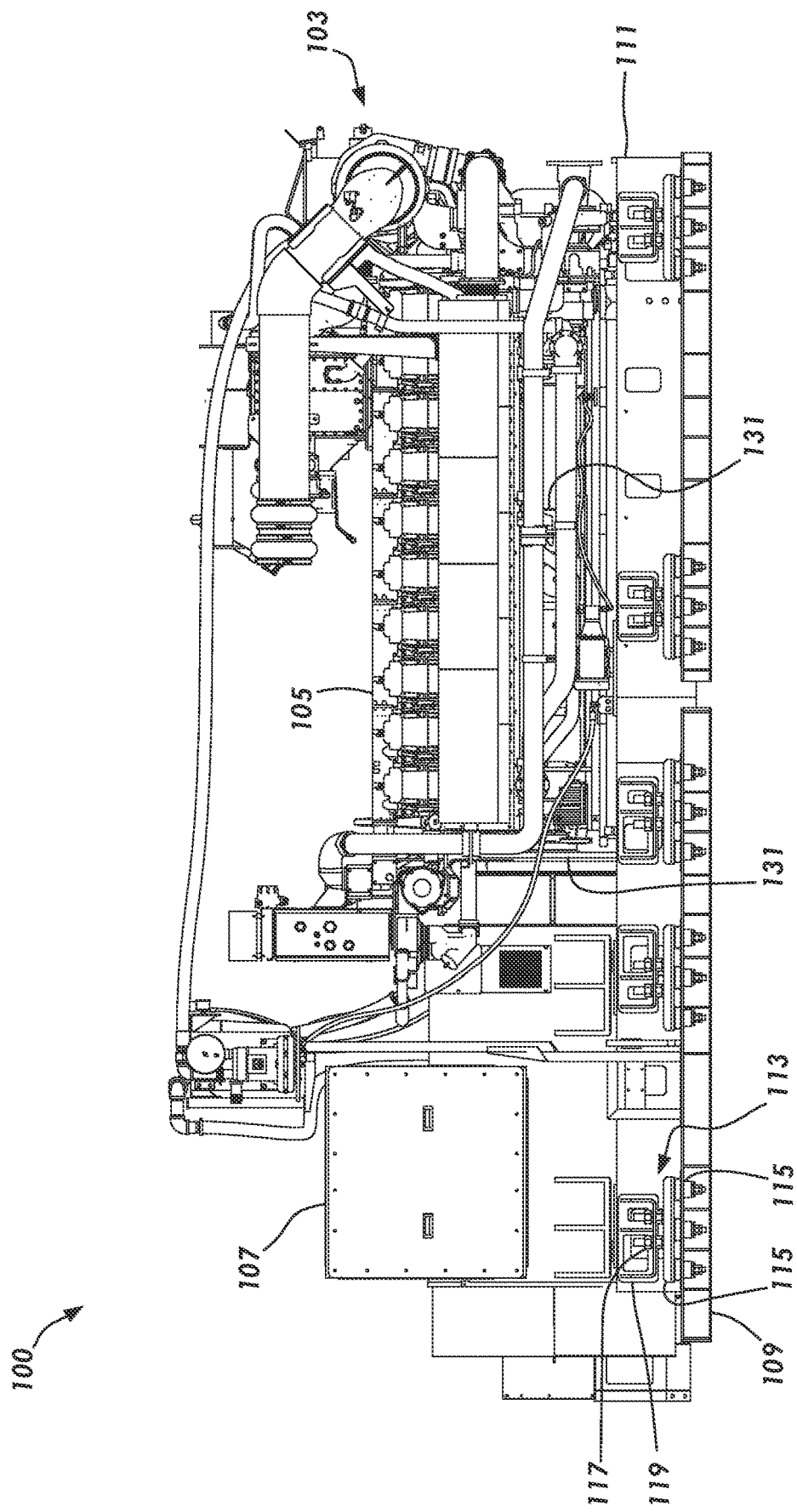
FIG. 2 is a side view of the generator set and vibration isolation mount system of FIG. 1.
Figure 5:
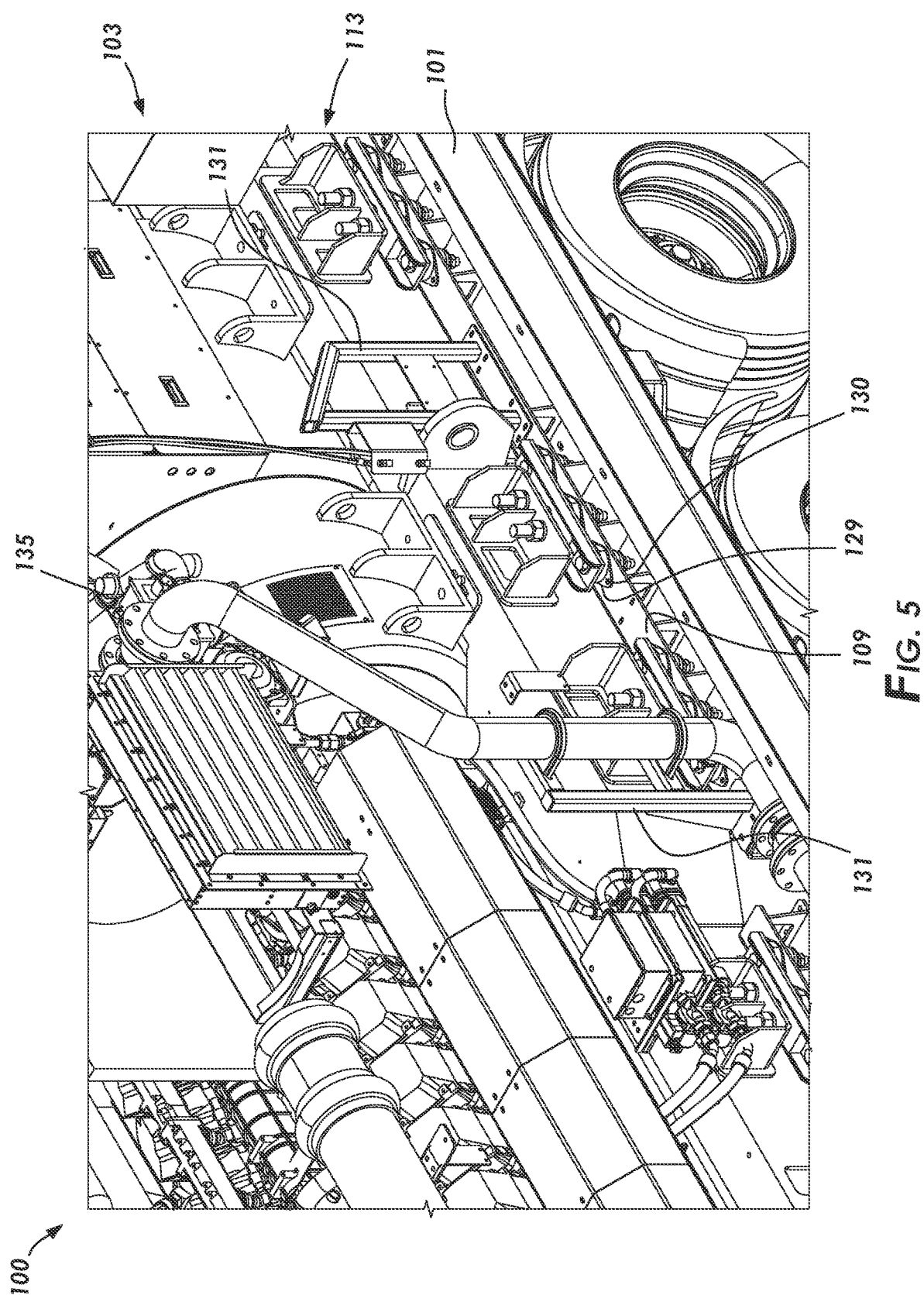
FIG. 5 is a partial perspective view of a vibration isolation mount system consistent with at least one embodiment of the present disclosure.

FIGS. 1 and 2 depict vibration isolation mount system 100. Vibration isolation mount system 100 may be positioned to couple between a skid, truck chassis, or trailer (such as trailer 101 shown in FIGS. 5-7) and equipment 103. In some embodiments, equipment 103 may be a generator set that may include engine 105 and generator 107. Generator 107 may be, for example and without limitation, diesel reciprocating, gas reciprocating, gas turbine, diesel turbine, or dual fuel turbine. Vibration isolation mount system 100 may include base rails 109 and mounting rails 111. Base rails 109 may couple to skid or trailer 101, and mounting rails 111 may mechanically couple to equipment 103. Mounting rails 111 may be mechanically coupled to base rails 109 by one or more vibration isolators 113.

Figure 3:
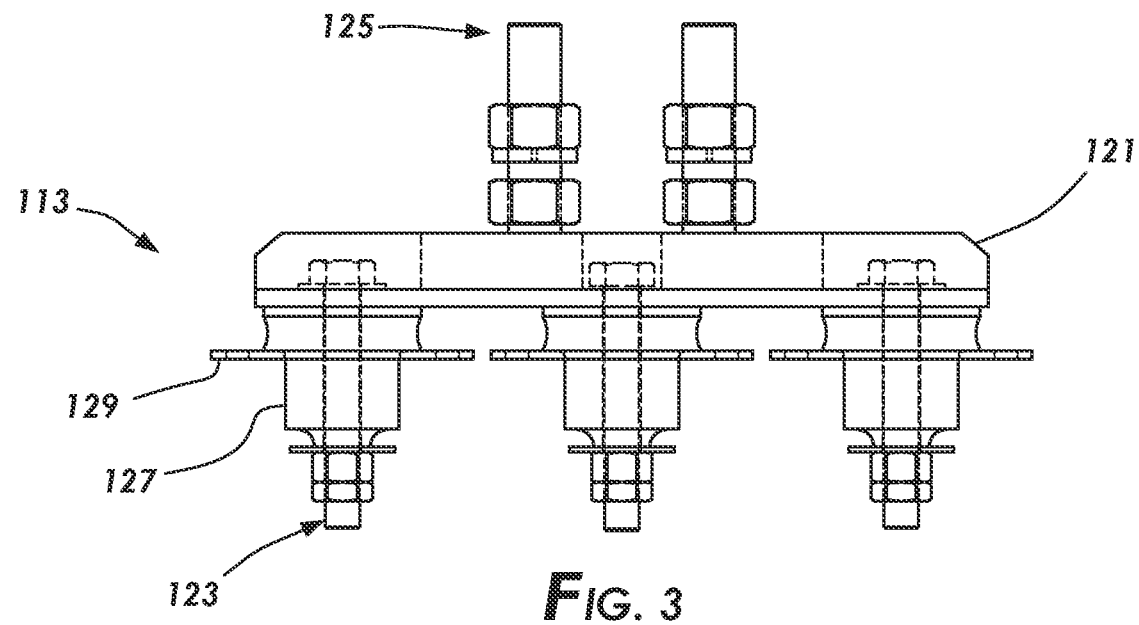
FIG. 3 is a side view of a vibration isolator consistent with at least one embodiment of the present disclosure.
Figure 4:
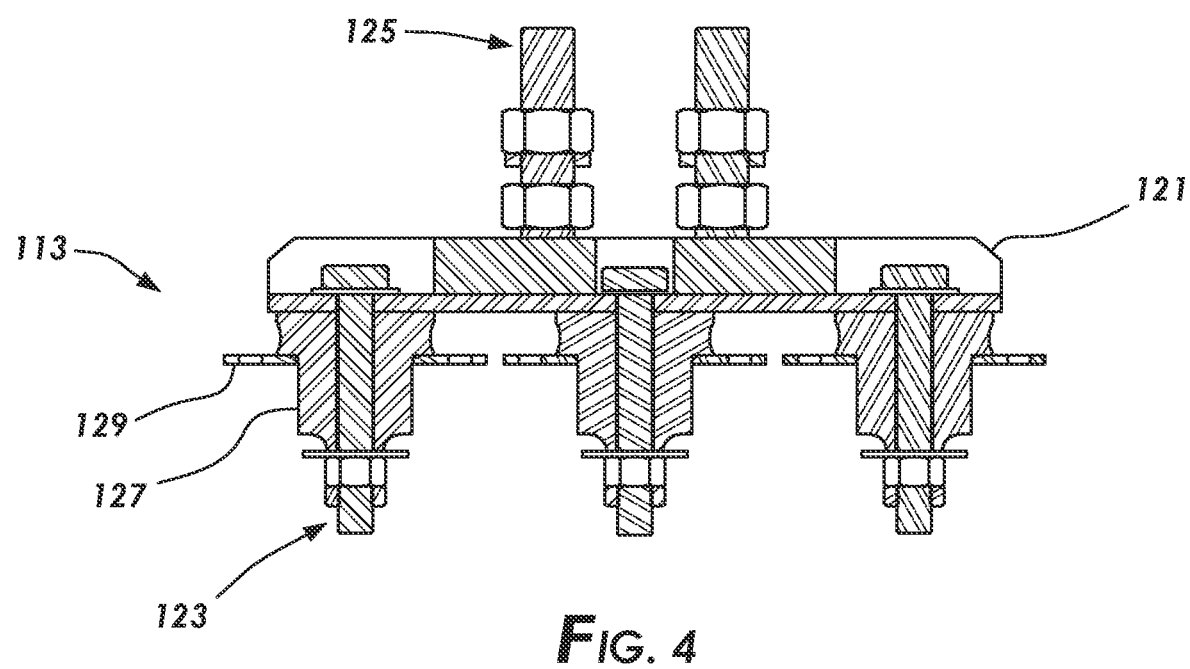
FIG. 4 is a cross section view of the vibration isolator of FIG. 3.

In some embodiments, each vibration isolator 113 may couple to base rails 109 by engaging one or more base holes 115 formed in base rails 109 and one or more stud holes 117 formed in mounting bracket 119 of mounting rails 111. As shown in FIGS. 3 and 4, vibration isolator 113 may include isolator body 121, one or more foundation pins 123, and one or more studs 125. Foundation pins 123 may extend generally downward from isolator body 121. In some embodiments, each foundation pin 123 may include foundation elastomeric body 127 positioned between isolator body 121 and base plate 129. Base plate 129 may be adapted to engage onto base rails 109 such that transfer of movement or vibration between skid, truck chassis, or trailer 101 and equipment 103 is reduced. In some embodiments, base plate 129 may mechanically couple to base rails 109 by, for example and without limitation, one or more threaded fasteners 130 (visible in FIG. 5). In some embodiments, foundation elastomeric body 127 may extend through base holes 115 and may serve to similarly damp horizontal movement between skid or trailer 101 and equipment 103.

In some embodiments, each stud 125 may be adapted to engage with and couple to mounting bracket 119 of mounting rails 111. In some embodiments, studs 125 may be threaded members and may receive a threaded fastener to couple to mounting bracket 119. In some embodiments, by removing the threaded fasteners from studs 125 of each vibration isolator 113, equipment 103 and mounting rails 111 may be decoupled from skid, truck chassis, or trailer 101 and may be lifted off thereof by, for example and without limitation, a crane.

Figure 6:
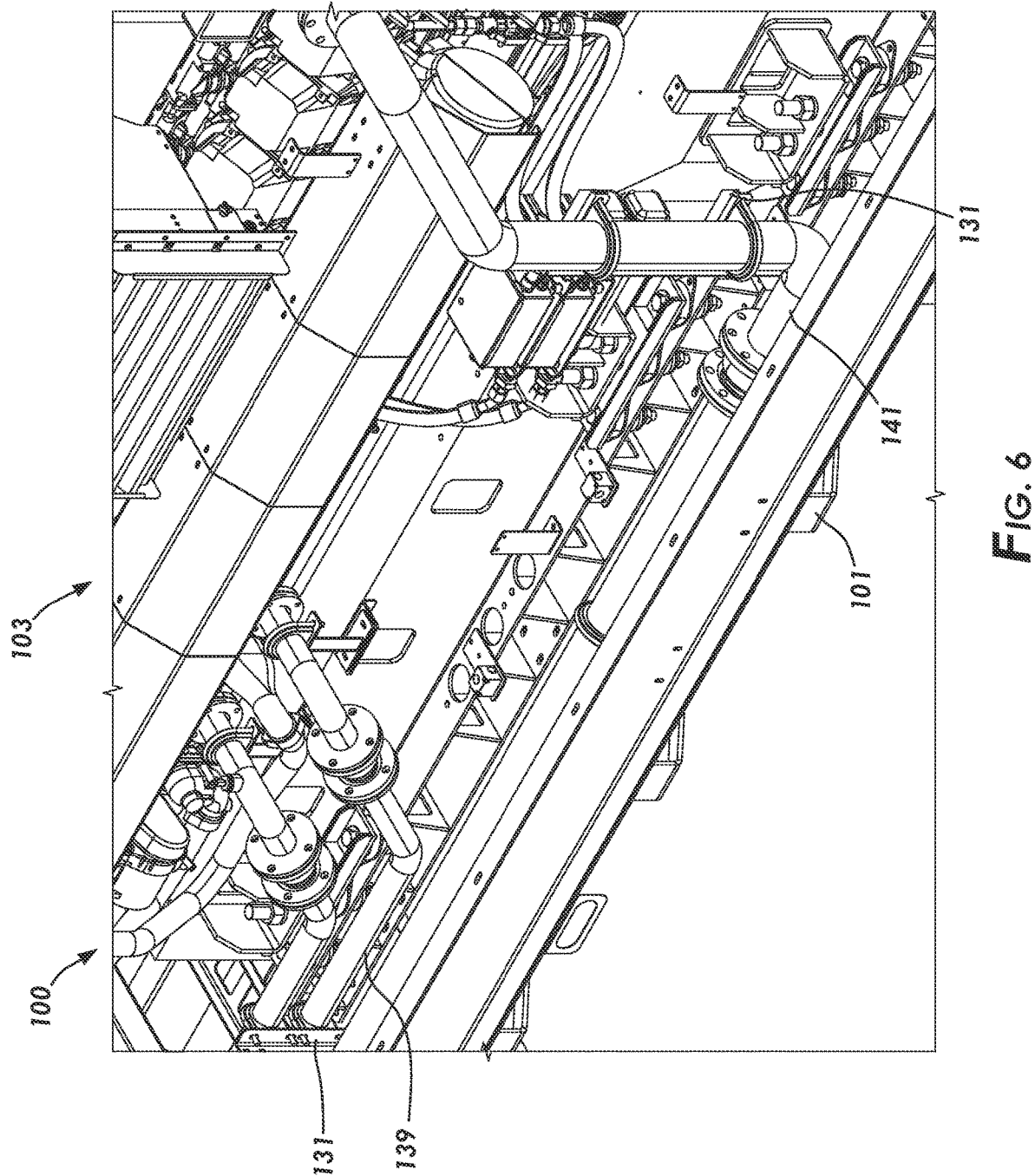
FIG. 6 is a partial perspective view of a vibration isolation mount system consistent with at least one embodiment of the present disclosure.
Figure 7:
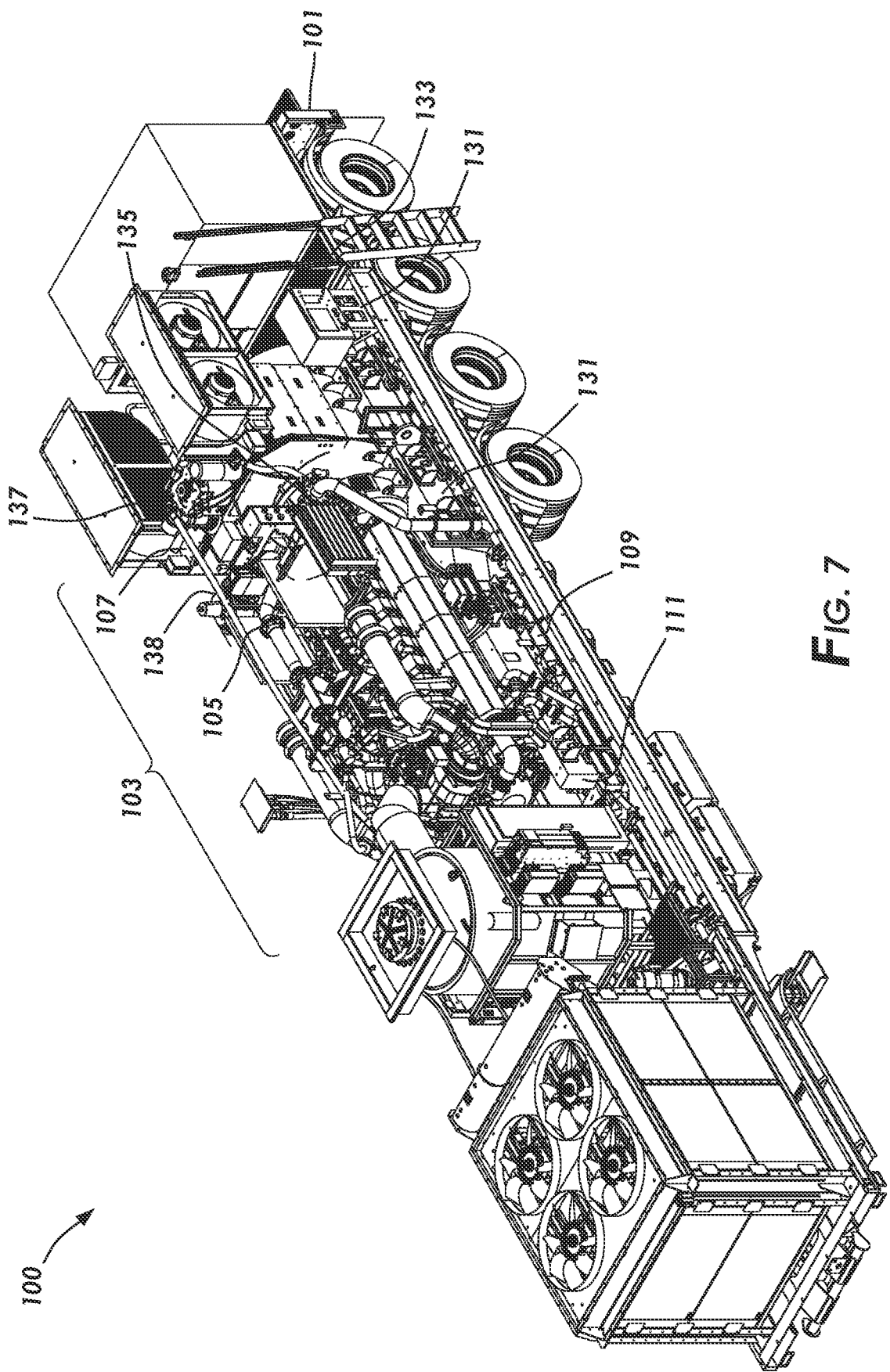
FIG. 7 is a perspective view of a generator set and vibration isolation mount system mounted on a trailer consistent with at least one embodiment of the present disclosure.

In some embodiments, with reference to FIGS. 1 and 2, vibration isolation mount system 100 may include one or more auxiliary brackets 131 coupled to base rails 109. Auxiliary brackets 131 may, for example and without limitation, support auxiliary equipment 133 such as, for example and without limitation, a control system enclosure. For example, FIG. 7 depicts cooling piping 135, crank case ventilation filtration 137, and fuel supply (including regulators and shut offs) systems 138 that may be supported by auxiliary brackets 131. As another nonlimiting example, FIG. 6 depicts auxiliary brackets 131 supporting jacket water heating and cooling pipes 139 and engine fluid heating 141 in the space adjacent to mounting rails 111.

In some embodiments, vibration isolation mount system 100 may provide a low-profile connection between skid, truck chassis, or trailer 101 and equipment 103 by positioning mounting rails 111 beside base rails 109 such that, for example and without limitation, the overall height of skid, truck chassis, or trailer 101 and equipment 103 may be below thirteen feet, six inches, consistent with road transport regulations.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A vibration isolator mount system comprising:
a base rail;
a mounting rail coupled to a generator set, the mounting rail including a mounting bracket; and
a vibration isolator, the vibration isolator including:
an isolator body;
a foundation pin, the foundation pin extending downward from the isolator body and through a base hole formed in the base rail, the foundation pin including:
a base plate; and
a foundation elastomeric body, the foundation elastomeric body positioned between the isolator body and the base plate; and
a stud, the stud extending upward from the isolator body and through a stud hole formed in the mounting bracket.

2. The vibration isolator mount of claim 1, further comprising an auxiliary bracket coupled to the base rail.

3. The vibration isolator mount of claim 2, further comprising auxiliary equipment coupled to the auxiliary bracket.

4. The vibration isolator mount of claim 3, wherein the auxiliary equipment comprises one or more of a control system enclosure, cooling piping, crank case ventilation filtration, fuel supply systems, water jacket heating and cooling pipes, and engine fluid heating.

5. The vibration isolator mount of claim 1, wherein the base rail is coupled to a trailer, truck chassis, or skid.

6. The vibration isolator mount of claim 1, wherein the generator set includes an engine and a generator.

7. The vibration isolator mount of claim 1, wherein the base plate mechanically couples to the base rail by a threaded fastener.

8. The vibration isolator mount of claim 1, wherein the mounting rail is positioned beside the base rail.

9. A system comprising:
a trailer, truck chassis, or skid;
a vibration isolator mount system comprising:
a base rail coupled to the trailer, truck chassis, or skid;
a mounting rail coupled to a generator set, the mounting rail including a mounting bracket; and
a vibration isolator, the vibration isolator including:
an isolator body;
a foundation pin, the foundation pin extending downward from the isolator body and through a base hole formed in the base rail, the foundation pin including:
a base plate; and
a foundation elastomeric body, the foundation elastomeric body positioned between the isolator body and the base plate; and
a stud, the stud extending upward from the isolator body and through a stud hole formed in the mounting bracket.

* * * * *